(12) United States Patent
Sztykiel et al.

(10) Patent No.: US 6,782,965 B2
(45) Date of Patent: Aug. 31, 2004

(54) TRUCK CHASSIS CONFIGURATION

(75) Inventors: George W. Sztykiel, East Lansing, MI (US); David L. Cain, Eaton Rapids, MI (US)

(73) Assignee: Spartan Motors Inc.

( * ) Notice: Subject to any disclaimer, the term of this patent is extended or adjusted under 35 U.S.C. 154(b) by 9 days.

(21) Appl. No.: 10/083,904

(22) Filed: Feb. 27, 2002

(65) Prior Publication Data

US 2002/0117345 A1 Aug. 29, 2002

Related U.S. Application Data

(60) Provisional application No. 60/272,229, filed on Feb. 28, 2001.

(51) Int. Cl.$^7$ ................................................. B60K 8/00
(52) U.S. Cl. ................... 180/292; 180/291; 180/58; 280/781; 280/789
(58) Field of Search ................ 180/68.3, 291, 180/58, 68.1, 68.2, 292, 299, 286, 287, 290, 294, 295, 296, 297, 300, 55, 420, 89.1, 14.1, 14.2, 68.4, 686, 692, 69.22, 69.23, 69.24, 370, 376; 280/781, 789, 796, 790, 2; 296/164, 178, 204, 205; 123/41.18, 41.33; 366/54, 44

(56) References Cited

U.S. PATENT DOCUMENTS

| | | | | |
|---|---|---|---|---|
| 2,005,312 A | * | 6/1935 | Church | 180/55 |
| 2,344,983 A | * | 3/1944 | Fageol | 180/24.01 |
| 2,407,007 A | * | 9/1946 | Henrichsen | 180/420 |
| 2,859,949 A | * | 11/1958 | Willard | 366/44 |
| 3,783,964 A | * | 1/1974 | Telesio | 180/294 |
| 3,989,119 A | * | 11/1976 | Cady | 180/89.1 |
| 4,059,170 A |   | 11/1977 | Young | |
| 4,111,273 A | * | 9/1978 | Blackburn et al. | 180/14.1 |
| 4,202,296 A | * | 5/1980 | Nonnenmann et al. | 123/41.48 |
| 4,811,804 A |   | 3/1989 | Ewers et al. | |
| 5,147,003 A | * | 9/1992 | De Monclin | 180/14.2 |
| 5,314,205 A |   | 5/1994 | Glesmann | |
| 5,499,690 A | * | 3/1996 | Shearn et al. | 180/68.4 |
| 5,562,179 A | * | 10/1996 | McAdam | 180/379 |
| 5,863,070 A |   | 1/1999 | William et al. | |
| 6,062,716 A | * | 5/2000 | Georgoulis | 366/54 |
| 6,336,676 B2 | * | 1/2002 | Gaspard et al. | 296/178 |
| 6,345,680 B1 | * | 2/2002 | Hill | 180/376 |
| 6,494,285 B1 | * | 12/2002 | Williams | 180/291 |
| 6,536,381 B2 | * | 3/2003 | Langervik | 123/41.33 |

\* cited by examiner

Primary Examiner—Brian L. Johnson
Assistant Examiner—Hau Phan
(74) Attorney, Agent, or Firm—John M. Naber

(57) ABSTRACT

A powertrain configuration for a truck chassis includes a chassis having at least two frame rails and at least one intermediate cross member. A forward wheel assembly is attached to a forward region of the chassis and a rearward wheel assembly is attached to a rearward region of the chassis. An engine is positioned adjacent to the forward wheel assembly and attached to two chassis frame rails such that, at most, only ten percent of an overall engine height extends above a top of the chassis frame rails. The powertrain configuration may further include a transmission attached to the engine and a driveshaft attached to the transmission.

12 Claims, 5 Drawing Sheets

TRUCK CHASSIS CONFIGURATION

CROSS REFERENCE TO RELATED APPLICATIONS

This application claims priority to a provisional patent application Ser. No. 60/272,229 titled, "An Improved Fire Truck Chassis Configuration," filed Feb. 28, 2001. The entire disclosure of serial No. 60/272,229 is incorporated herein by reference in its entirety.

BACKGROUND OF THE INVENTION

Field of the Invention

The present invention relates to a heavy vehicle chassis configuration and more particularly to a cost-effective and efficient mid-engine chassis powertrain configuration suitable for use in a fire truck.

BACKGROUND AND DESCRIPTION OF THE PRIOR ART

Fire trucks are often considered "heavy" vehicles typically referring to their weight of more than 10,000 pounds. These vehicles usually have an engine mounted forward of the front axle or front suspension. A heavy vehicle chassis typically houses mechanical workings such as suspension, powertrain, steering, braking, and cooling systems. Overall vehicle construction typically includes a chassis, a superstructure, and a cab (or body). See generally, U.S. Pat. No. 5,863,070 to Williams, et al., and U.S. Pat. No. 5,314,205 to Glesmann.

Heavy vehicles, not surprisingly, often require heavy engines to propel them. Front and rear mounted engines can create a vehicle with uneven weight distribution. Front-end engine placement (i.e., mounted ahead of a front axle or front suspension) creates a large engine housing that extends into the vehicle cab and subjects occupants to excessive engine heat and noise. This housing often covers part of an engine tunnel (or channel) used to direct airflow past a heat exchanger. The tunnel and corresponding housing within the cab also significantly reduce driver and passenger space in the front of the vehicle. Nevertheless, a vehicle designer is forced to restrict space in the vehicle cab to accommodate the engine housing and tunnel.

Rear-end engine placement configurations in trucks (i.e., engine is mounted behind the rear axle) are known in the art as a way to reduce engine noise, space and heat in the vehicle cab as described above. See generally, U.S. Pat. No. 4,811,804 to Ewers et al. This design achieves these goals but at great expense and loss of much of the rearward usable chassis space.

Mid-engine truck chassis configurations are also known in the art including fire trucks. For example, U.S. Pat. No. 4,059,170 to Young claims a mid-engine chassis design as a means to improve vehicle handling and safety by significantly reducing the load to the front tires. Mid-engine placement in a heavy fire truck chassis has been referred to in the art as a Spartan Motor Baron-type configuration. The mid-engine configuration allows more design flexibility and conveniences but is expensive since specialized and complicated cooling systems need to be adapted for such a configuration.

Thus, there is a desire and need for a heavy vehicle chassis that not only improves vehicle cab occupancy space, weight distribution, handling, and design flexibility, but also accomplishes these objects in a manner that is cost-effective and efficient.

SUMMARY OF THE INVENTION

Accordingly, the present invention provides a truck chassis configuration. Overall, engine placement in the chassis configuration of the present invention allows sufficient ground clearance, reduces overall engine noise within the cab, provides easy access for maintenance, improves handling and maneuverability, and simplifies engine cooling systems. The engine placement is also cost-effective, while not raising the vehicle's overall center of gravity or significantly increasing vehicle cost.

The invention is a truck with a chassis frame having at least two chassis frame rails having a forward region and a rearward region, at least one intermediate cross member connecting the frame rails, a forward wheel assembly comprising at least two front wheels, a forward axle, and a forward suspension assembly attached to the chassis frame rails, and a rearward wheel assembly comprising at least two rearward wheels, at least one rearward axle, and rearward suspension assembly attached to the chassis frame rails. The invention is a truck with a powertrain comprising an engine, transmission and drive-shaft mounted to at least one wheel assembly positioned between and attached to the chassis frame rails between the front wheel assembly and the rearward wheel assembly and being at a position that the engine top extends no more than 10 percent of an overall engine height above the chassis frame rails.

The invention can have a engine or powertrain cooling system disposed between the chassis frame rails that can have a heat exchanger, a fan (mechanical or hydrostatic), an engine tunnel configured to extend no more than 24 inches (61 cm) in height above the chassis frame rail at its highest point and extending above the chassis frame rails no more than 38 inches (97 cm) in length, the engine tunnel width defined by a dimension separating the chassis frame rails, and a coolant flow path connecting the engine and the heat exchanger. The heat exchanger can be located at the front or rear of the engine tunnel or anywhere in between.

In one embodiment of the present invention, the heat exchanger can be non-vertical, including horizontal. In this embodiment, the need for an engine tunnel is significantly reduced or even eliminated.

The present invention can also have a cab attached to and above a forward region of the chassis frame comprising a cab floor and a cab floor inclined front section, the cab floor inclined front section configured to conform to the dimensions of the engine tunnel.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and drawings below, in which like numerals represent like elements and in which.

DETAILED DESCRIPTION OF THE INVENTION

Figure 1:
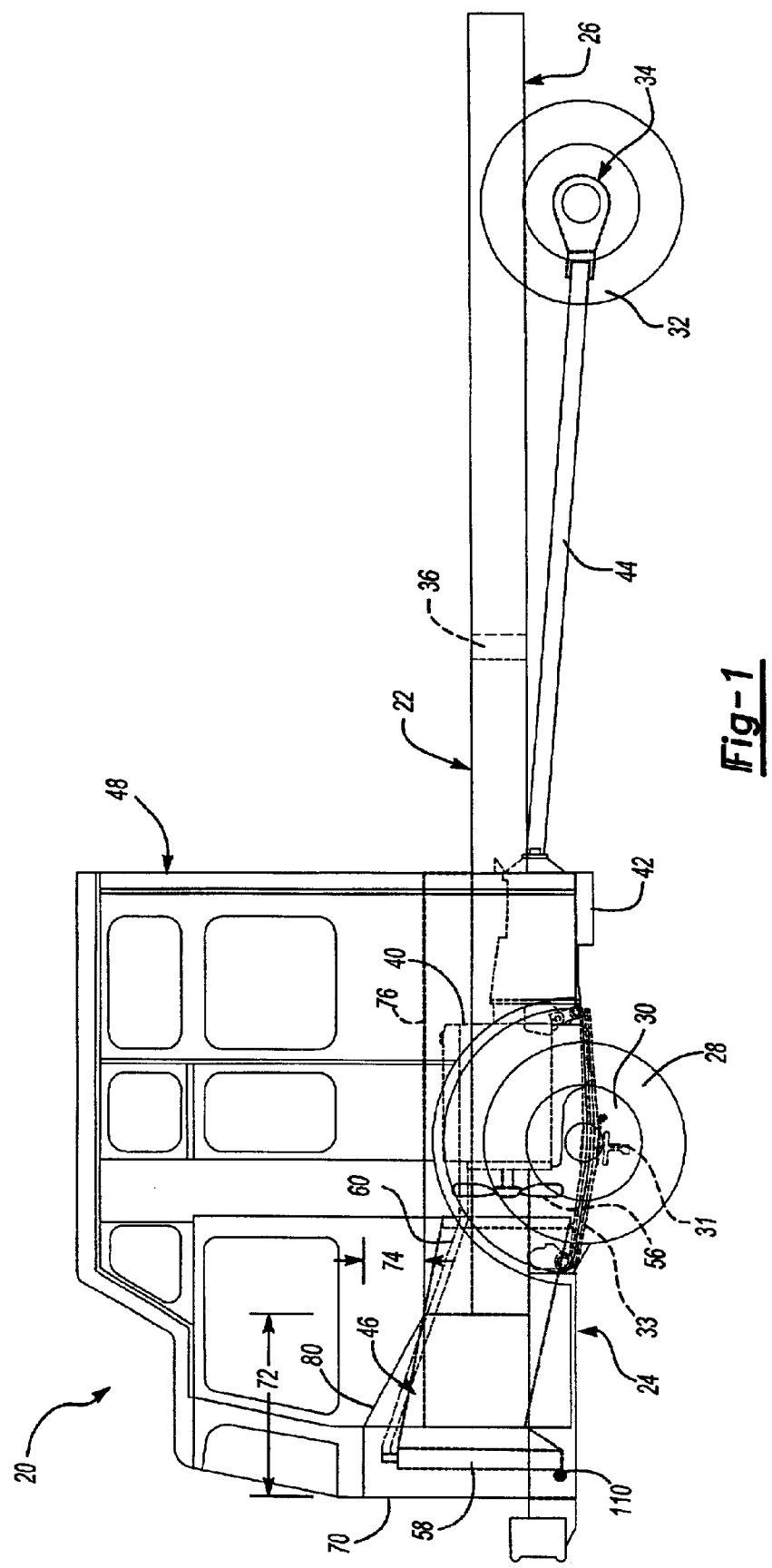
FIG. 1 illustrates a side view of one embodiment of the present invention.
Figure 2:
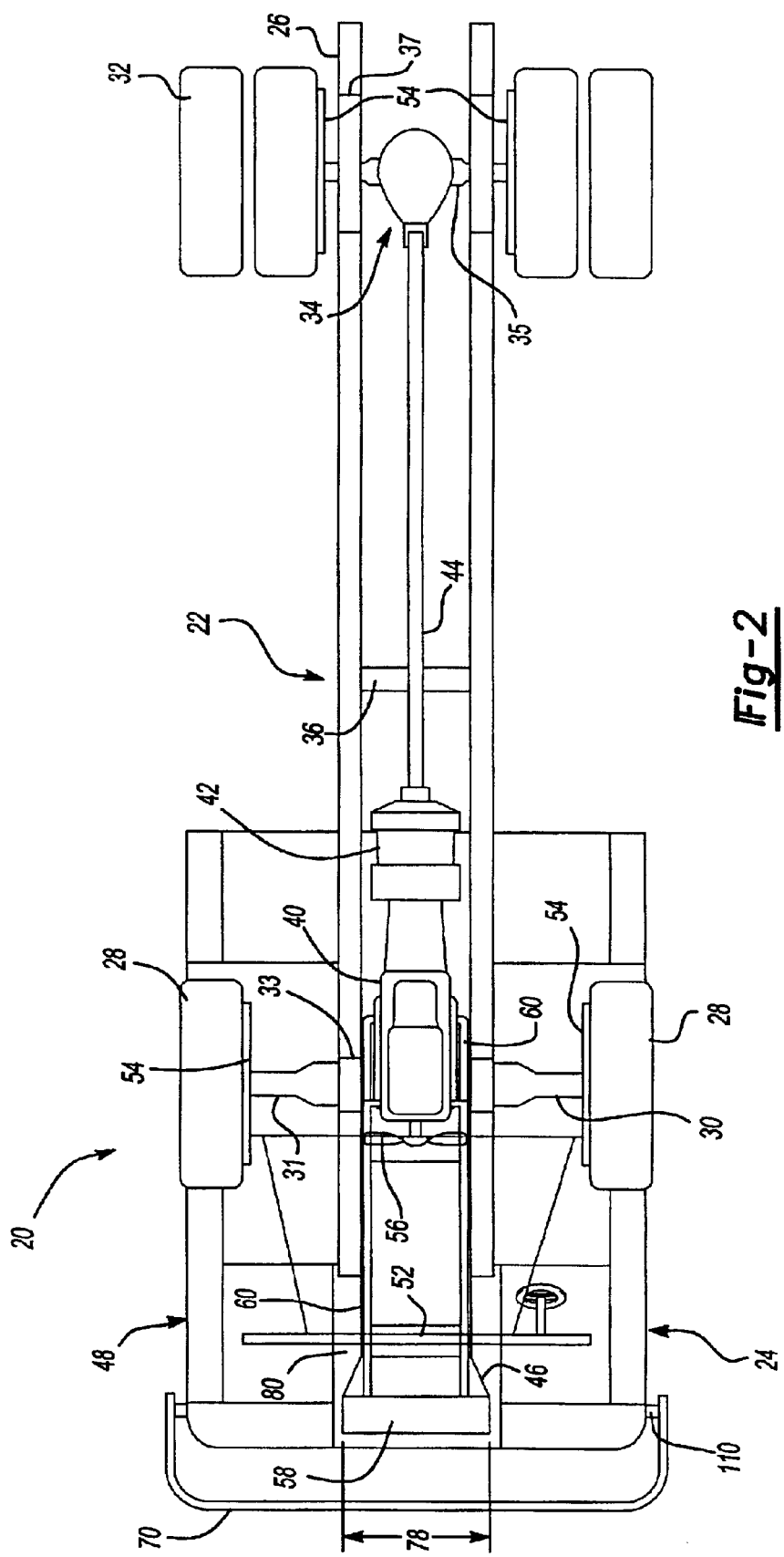
FIG. 2 illustrates a top view of one embodiment of the present invention.
Figure 3:
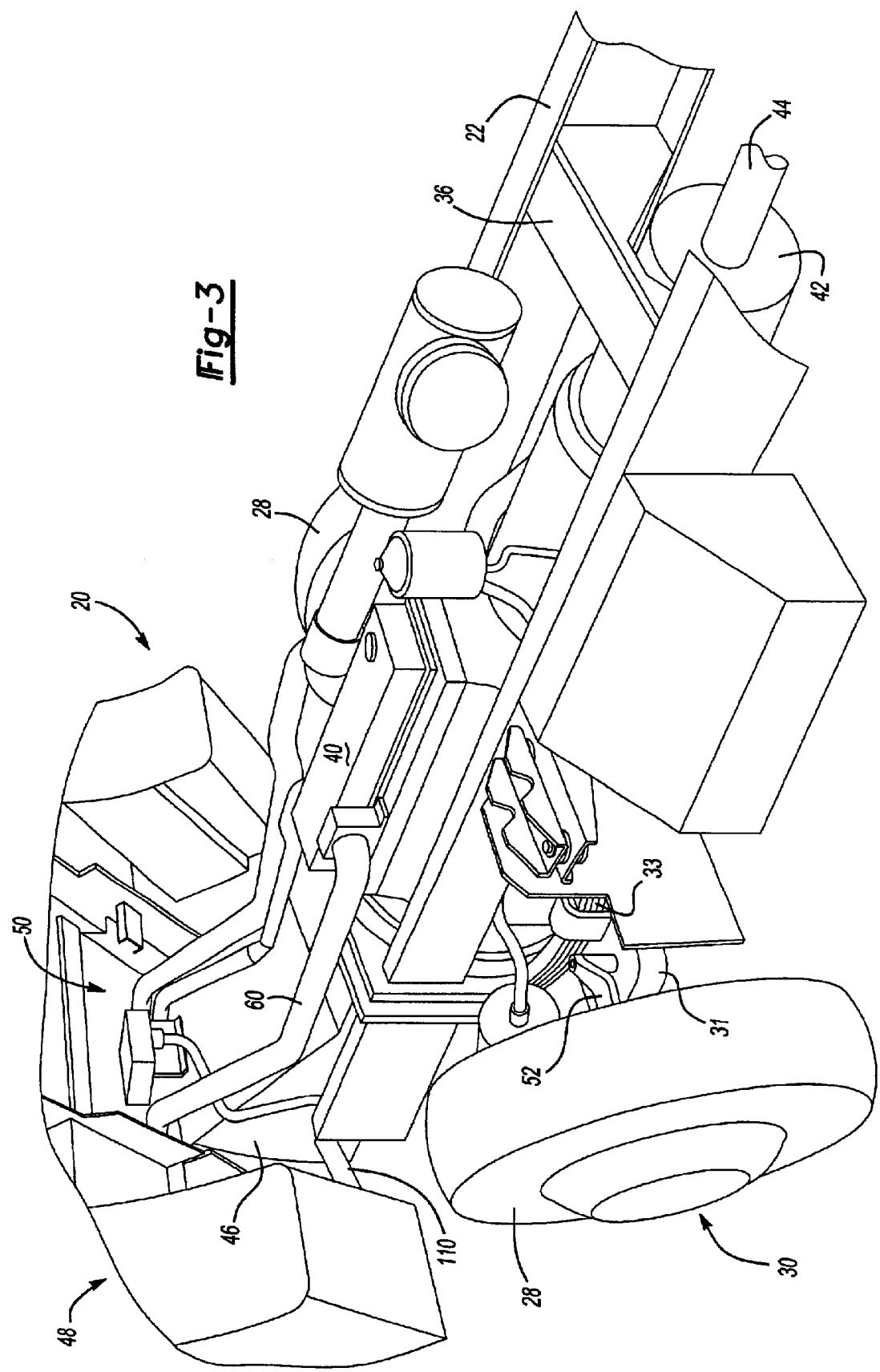
FIG. 3 illustrates a perspective view of the present invention with the hinged cab raised to expose the chassis.

The present invention generally relates to a truck chassis powertrain configuration. FIGS. 1, 2 and 3 illustrate side, top, and perspective views, respectively, of one embodiment of the present invention. In this embodiment, a truck chassis generally indicated at 20 is illustrated having a chassis frame 22 having at least two frame rails. The chassis 20 has a forward region 24 (generally the forward half of the chassis 20) and a rearward region 26 (generally the rearward half of the chassis 20) and can generally be used as a fire truck chassis.

The chassis frame 22 begins at the forward region 24 at a point beyond a forward wheel assembly 30. The forward wheel assembly 30 has at least two front wheels 28 (which can be steerable), at least one forward axle 31 and a forward suspension assembly 33 attached to the chassis frame 22 rails. The forward wheel assembly 30 is attached to the forward region 24 of the chassis 20. The chassis frame 22 runs rearward to the rearward region 26 of the chassis 20 to a point beyond a rearward wheel assembly 34. The rearward wheel assembly 34 has at least two rear wheels 32, at least one rearward axle 35 and a rearward suspension assembly 37 attached to the chassis frame 22 rails at the rearward region 26 of the chassis 20. The rearward wheel assembly 34 can also be configured to be steerable (not shown). The distance beyond which the chassis frame 22 extends past the wheel assemblies 30 and 34 is dictated by good engineering principles which, in turn, are governed by the length, gross vehicle weight and suspension requirements of a particular vehicle. The same is true for the number of axles on each wheel assembly 30 and 34. The present embodiment for simplicity uses only one axle per wheel assembly (forward 30 and rearward 34).

The chassis frame 22 is preferably made of steel and can be approximately eight to ten inches (25 cm) in height. At least one intermediate cross member 36 can lay perpendicular to and affixes to, thus connecting, the chassis frame 22 rails at predetermined points and are cut to a length to define a width of the chassis frame 22. The intermediate cross member 36 adds strength to the chassis 20. The width of the chassis 20 is a distance governed by the engineering needs of the particular vehicle. These needs can include the space needed to house a powertrain and an engine (or powertrain) cooling system ("cooling system") 50 as described below.

The powertrain can have an engine 40, a transmission 42, and a driveshaft 44. The transmission 42 can be attached to the engine 40 and the driveshaft 44 can be attached to the transmission 42. In the illustrated embodiment, the driveshaft 44 is attached to the rearward wheel assembly 34 through the rearward axle 35.

The cooling system 50 has a heat exchanger 58, a fan 56, an engine tunnel 46, and a coolant flow path 60. The coolant flow path 60 connects the engine 40 and heat exchanger 58. In the embodiment illustrated in FIGS. 1, 2, and 3, the heat exchanger 58 is vertical and disposed in the forward end of the engine tunnel 46. The heat exchanger 58 can also be disposed at the rear end of the engine tunnel 46. The present invention can use a mechanical or hydrostatic fan 56 drive whereby the entire cooling system 50 is confined between the chassis frame 22 rails.

The engine tunnel 46 can be configured to extend no more than 24 inches (61 cm) in height above the chassis frame rail at its highest point and extending no more than 38 inches (97 cm) in length, the engine tunnel 46 width defined by a dimension separating the chassis frame rails. These dimensions are greatly reduced over the prior art.

The chassis frame 22 can also house a steering unit 52 and braking systems 54. These are well known in the art. Other powertrain configurations are also possible such as front wheels 28 or all wheel drives. In the embodiment shown in FIGS. 1, 2 and 3, the transmission 42 and driveshaft 44 are coupled to the rear wheels 32. Thus, the rearward wheel assembly 34 has the drive wheels. Alternatively, the vehicle could be configured to couple a powertrain to the forward wheel assembly 30 by mounting the engine 40, transmission 42, and driveshaft 44 at 180 degrees to the configuration shown, or in any of a number of other positions known in the art to facilitate the front wheel 28 drive configuration. Thus, the drive wheels would be within the forward wheel assembly 30. The driveshaft 44 can also be mounted to at least one wheel assembly 30 or 34.

The configuration illustrated in FIGS. 1, 2 and 3 shows the engine 40 positioned just behind the forward wheel assembly 30. This configuration distributes more engine 40 weight to the rearward wheel assembly 34 to give improved chassis 20 weight distribution over a conventional forward mounted engine 40 configuration. Further, it eliminates the need for a large engine tunnel 46 as is known in the art. The present invention can be configured to position the engine 40, transmission 42 and driveshaft 44 anywhere between and attached to two chassis frame 22 rails between the forward wheel assembly 30 and the rearward wheel assembly 34.

A noted improvement in the present invention over the prior art mid-engine chassis 20 configuration is the ability to use the conventional engine 40 such as a 6-cylinder Cummins, Inc. ISB 300HP. Other conventional engines 40 could be used such as those supplied by Caterpillar, Inc. The present invention also eliminates the need to use more expensive 40 cooling systems 50 as used in the art (such as is found in the Spartan Motor Baron mid-engine configuration). This is due in part to the cooling system 50 remaining within the chassis frame 22 as opposed to side mounting in the prior art.

The present invention mounts the conventional engine 40 as shown in FIG. 1 to allow only a minimal amount of the engine 40 to extend above the chassis frame 22 as found in the prior art. Specifically, as shown in FIG. 1, the engine 40 is positioned so that at most only about ten percent of the overall engine 40 height needs to extend above a top of the chassis frame 22 rails.

Overall, the engine 40 placement as found in the illustrated embodiments allows sufficient engine 40 bottom ground clearance that is not lowered to unsafe levels, reduces overall engine 40 noise within a cab (see below), provides easy access for maintenance, improves handling and maneuverability, and simplifies cooling systems, while not raising the vehicle's overall center of gravity or significantly increasing vehicle cost.

As illustrated, the chassis frame 22 also allows for efficient and cost effective engine 40 or powertrain cooling and cab designs. FIGS. 1, 2 and 3 and show one vehicle cooling system 50 configuration of the present invention. The present invention allows a simple cooling system 50 configuration well known in the art despite the location of the engine 40. Further the cooling system 50 is predominately confined to within the chassis frame 22. The engine tunnel 46 of the present invention minimally extends into a vehicle cab 48 beginning at or near a cab front 70 and attached to and above the forward region 24 of the chassis frame 22. For example, in the embodiment illustrated in FIGS. 1 through 3, the vehicle cab 48 can have a cab floor 76 and the cab front 70. The cab floor 76 can have a cab floor inclined front section 80 to conform to the shape and dimensions of the engine tunnel 46 (described above). As shown in FIG. 3, the vehicle cab 48 can have a cab hinge 110. The cab hinge 110 allows access to chassis 20 components by raising the vehicle cab 48 up and away from the chassis 20 as illustrated. This cab hinge 110 mechanism is well known in the art.

As illustrated in the embodiment of FIGS. 1, 2 and 3, the cab floor inclined front section 80 of the engine tunnel 46 can be configured to extend from the cab front 70 rearward to a first dimension 72 of no more than thirty-eight inches (38") (97 cm) in length and extend upward from the lowest part of the cab floor 76 to a second dimension 74 of no more than twenty-four inches (24") (61 cm) in height above the chassis frame 22 rail into the vehicle cab 48 at its highest point. A third dimension 78, shown in FIG. 2, is the width of the cab floor inclined front section 80. This third dimension 78, (as well as and the engine tunnel 46 width) is defined by and can be configured to conform to the width of the chassis frame 22. Again, these dimensions are greatly reduced over the prior art.

Other possible embodiments could also allow for a side-mounted or non-vertical mounted heat exchanger 58 or the rear-mounted engine tunnel 46 as part of the cooling system 50. For side mounted cooling systems, the system would be mounted near the engine 40 but outside of the chassis frame 22 (not shown).

Figure 4:
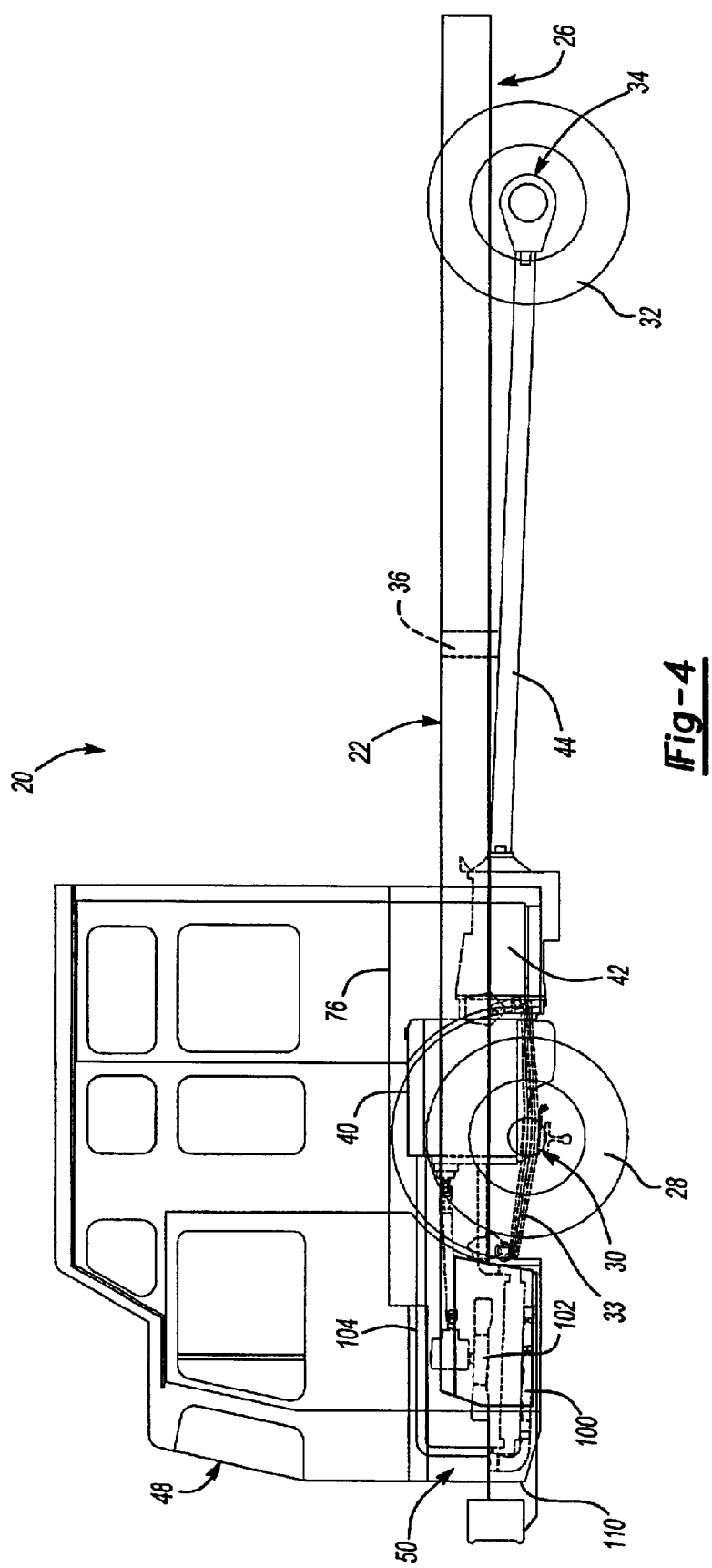
FIG. 4 illustrates an alternate embodiment of the present invention having a non-vertical heat exchanger.

FIG. 4 illustrates an embodiment of the present invention configured with a non-vertical mounted heat exchanger 58. As shown, a horizontal heat exchanger 100 (such as a radiator), a horizontal fan 102, and a horizontal coolant loop 104 are mounted within the confines of the chassis frame 22. In this configuration, the cab floor 76 can be configured to have essentially a flat floor space. In this configuration, the first dimension 72, second dimension 74, and third dimension 78 are reduced or even eliminated. In other words, the cab floor inclined front section 80 is removed. This allows greater design flexibility for inclusion of passengers and equipment over the other embodiments using the vertically mounted heat exchangers.

Figure 5:
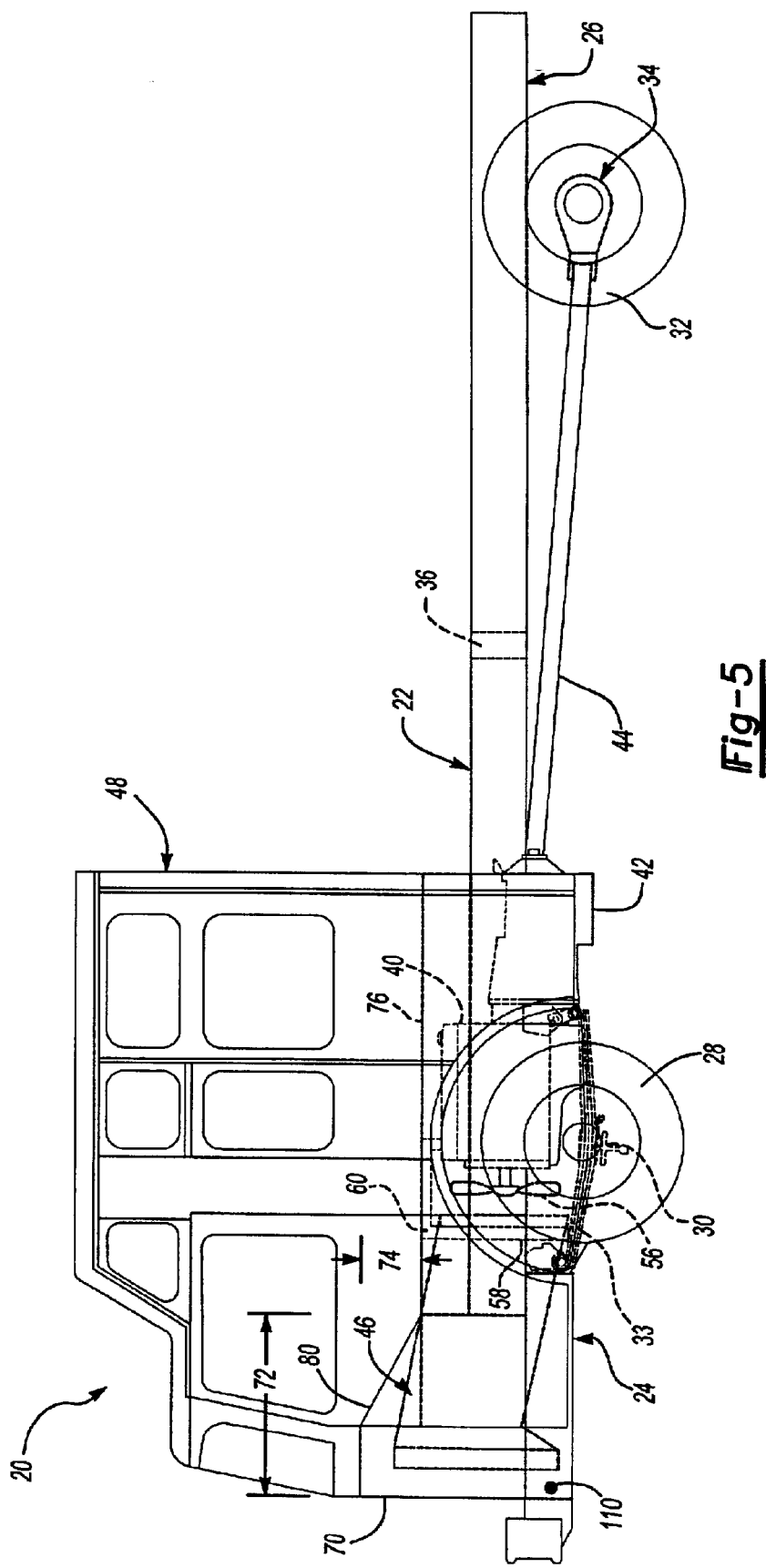
FIG. 5 illustrates an alternate embodiment of the present invention showing the heat exchanger moved closer to the fan.

FIG. 5 adds one more illustration of an embodiment of the present invention with a vertical heat exchanger 58 located at the engine 40 side of the engine tunnel 46. The present invention allows flexibility to place the heat exchanger 58 anywhere within the engine tunnel 46.

The above description is that of just one embodiment of the invention. Various alterations and changes can be made without departing from the spirit and broader aspects of the invention as set forth in the claims. The embodiment of the invention in which exclusive property or privileges claimed are defined as follows.

We claim:

1. A fire truck comprising:
   a chassis frame, comprising at least two chassis frame rails having a forward region and a rearward region, at least one intermediate cross member connecting the chassis frame rails;
   a forward wheel assembly comprising at least two front wheels, at least one forward axle, and a forward suspension assembly attached to the chassis frame rails, a rearward wheel assembly comprising at least two rearward wheels, at least one rearward axle, and rearward suspension assembly attached to the chassis frame rails;
   a powertrain comprising an engine, transmission and driveshaft, the driveshaft mounted to at least one wheel assembly, the powertrain positioned adjacent the front wheel assembly and attached to the chassis frame rails between the front wheel assembly and the rearward wheel assembly and being at a position that an engine top extends no more than 10 percent of an overall engine height above the chassis frame rails;
   a cooling system comprising
      a heat exchanger;
      a fan;
      an engine tunnel configured to extend no more than 61 cm in height above the chassis frame rail at a highest point and extending no more than 97 cm in length, the engine tunnel width defined by a dimension separating the chassis frame rails; and
      a coolant flow path connecting the engine and the heat exchanger.

2. The truck of claim 1, wherein the heat exchanger is disposed at a forward end of the engine tunnel.

3. The fire truck of claim 1, wherein the heat exchanger is disposed at the rear of the engine tunnel.

4. The fire truck of claim 1, wherein the fan is a mechanical fan.

5. The fire truck of claim 1, wherein the fan is a hydrostatic fan.

6. The fire truck of claim 1, wherein the cooling system is mounted outside of the chassis frame rails.

7. The fire truck of claim 1, further comprising a cab attached to and above a forward region of the chassis frame comprising a cab floor and a cab floor inclined front section, the cab floor inclined front section configured to conform to the dimensions of the engine tunnel.

8. The fire truck of claim 1, wherein the placement of the powertrain between the chassis frame rails does not raise the vehicle's center of gravity and an engine bottom ground clearance is not lowered to unsafe levels.

9. A truck comprising:
   a chassis frame, comprising at least two chassis frame rails having a forward region and a rearward region, at least one intermediate cross member connecting the chassis frame rails;
   a forward wheel assembly comprising at least two front wheels, at least one forward axle, and a forward suspension assembly attached to the chassis frame rails;
   a rearward wheel assembly comprising at least two rearward wheels, at least one rearward axle, and a rearward suspension assembly attached to the chassis frame rails;
   a powertrain comprising an engine, transmission and driveshaft the driveshaft mounted to at least one wheel assembly, the powertrain positioned and attached to the chassis frame rails between the front wheel assembly and the rearward wheel assembly and being at a position that an engine top extends no more than 10 percent of an overall engine height above the chassis frame rails; and
   a cooling system disposed between the chassis frame rails, the cooling system including
      a heat exchanger;
      a fan;
      an engine tunnel configured to extend no more than 61 cm in height above the chassis frame rail at a highest point and extending no more than 97 cm in length, the engine tunnel width defined by a dimension separating the chassis frame rails; and
      a coolant flow path connecting the engine and the heat exchanger.

10. The truck chassis of claim 9, wherein the heat exchanger is disposed at a forward end of the engine tunnel.

11. The truck chassis of claim 9, wherein the heat exchanger is disposed at the rear of the engine tunnel.

12. The truck chassis of claim 9, further comprising a cab attached to and above a forward region of the chassis frame comprising a cab floor and a cab floor inclined front section, the cab floor inclined front section configured to conform to the dimensions of the engine tunnel.

* * * * *